United States Patent

Lux

(10) Patent No.: US 9,046,073 B2
(45) Date of Patent: Jun. 2, 2015

(54) LIFT-TYPE VERTICAL AXIS TURBINE

(76) Inventor: Glenn Raymond Lux, Saskatoon (CA)

(*) Notice: Subject to any disclaimer, the term of this patent is extended or adjusted under 35 U.S.C. 154(b) by 632 days.

(21) Appl. No.: 13/503,969

(22) PCT Filed: Oct. 26, 2010

(86) PCT No.: PCT/CA2010/001676
§ 371 (c)(1),
(2), (4) Date: Apr. 25, 2012

(87) PCT Pub. No.: WO2011/050452
PCT Pub. Date: May 5, 2011

(65) Prior Publication Data
US 2012/0224968 A1  Sep. 6, 2012

Related U.S. Application Data

(60) Provisional application No. 61/254,889, filed on Oct. 26, 2009.

(51) Int. Cl.
  *F03D 3/00* (2006.01)
(52) U.S. Cl.
  CPC ........... *F03D 3/005* (2013.01); *F05B 2220/706* (2013.01); *F05B 2240/212* (2013.01); *F05B 2260/402* (2013.01); *Y02E 10/74* (2013.01)
(58) Field of Classification Search
  CPC ........... F03D 3/06; F03D 3/005; F03D 3/061; F03D 3/062; F03D 3/065
  USPC ..................................................... 416/196 A
  See application file for complete search history.

(56) References Cited

U.S. PATENT DOCUMENTS

| | | | |
|---|---|---|---|
| 3,918,839 A | 11/1975 | Blackwell et al. |
| 4,134,707 A | 1/1979 | Ewers |
| 4,329,116 A | 5/1982 | Ljungstrom |
| 4,449,053 A | 5/1984 | Kutcher |
| 4,624,624 A | 11/1986 | Yum |
| 5,183,386 A | 2/1993 | Feldman et al. |

(Continued)

FOREIGN PATENT DOCUMENTS

| | | |
|---|---|---|
| DE | 3137966 | 3/1983 |
| EP | 0334241 | 9/1989 |

(Continued)

*Primary Examiner* — Nathaniel Wiehe
*Assistant Examiner* — Michael Sehn
(74) *Attorney, Agent, or Firm* — Ryan W. Dupuis; Kyle R. Satterthwait; Ader Company Inc.

(57) ABSTRACT

A vertical axis turbine includes a modified darrieus type rotor having at least three circumferentially spaced apart blades, each having an airfoil shape in cross section such that the blades generate a torque in a direction of rotation of the turbine about the vertical axis responsive to a generally horizontal wind across the blades. Support members, for example flexible cables, are connected under tension between adjacent ones of the blades to extend in a generally circumferential direction about the turbine at an inclination from horizontal in a criss-crossing pattern with other support members. A tensioning mechanism also urges opposing top and bottom ends of the rotor towards one another such that the blades are supported under compression in a pre-stressed condition by the support members and the tensioning mechanism to maintain the blades in a substantially rigid and fixed orientation throughout the operation of the turbine rotor.

19 Claims, 4 Drawing Sheets

(56) References Cited

U.S. PATENT DOCUMENTS

| | | |
|---|---|---|
| 5,531,567 A | 7/1996 | Hulls |
| 5,744,871 A | 4/1998 | Robles Akesolo |
| 6,857,846 B2 | 2/2005 | Miller |
| 6,979,170 B2 | 12/2005 | Dery et al. |
| 7,156,609 B2 | 1/2007 | Palley |
| 7,329,099 B2 * | 2/2008 | Hartman .................. 416/132 B |
| 2005/0248160 A1 | 11/2005 | Watkins |
| 2007/0048137 A1 | 3/2007 | Hartman |

FOREIGN PATENT DOCUMENTS

| | | |
|---|---|---|
| FR | 2878001 | 5/2006 |
| GB | 2 000 556 | 1/1979 |
| NL | 7606729 | 12/1977 |
| WO | 9108394 | 6/1991 |
| WO | 9535444 | 12/1995 |
| WO | 2006125118 | 11/2006 |
| WO | 2008131519 | 11/2008 |

* cited by examiner

LIFT-TYPE VERTICAL AXIS TURBINE

This application claims priority benefits from U.S. provisional application Ser. No. 61/254,889, filed Oct. 26, 2009.

FIELD OF THE INVENTION

The present invention relates to a modified darrieus or lift-type turbine in which the blades have a general airfoil-like shape and are supported for rotation above a vertical axis, and more particularly the present invention relates to a lift type turbine comprising generally circumferential support members between at least three lift-type blades.

BACKGROUND

Modern wind turbines are either horizontal axis turbines or vertical axis turbines. Horizontal axis wind turbines dominate the market world wide. They normally have a nacelle, rotor and blades that sit on top of a tower. The nacelle consists of the generator, planetary gearing and all the control systems necessary to operate the turbine. The rotor holds the blades (usually 3) in their positions while they rotate around the main shaft in the nacelle. These wind turbines work for many years with little maintenance; however, they are very expensive. The economics of horizontal axis wind turbines have been improving, but subsidies are still needed in most parts of the world to be an economical energy alternative.

The vertical axis lift type wind turbines (excluding drag-type turbines) such as the darrieus-type rotor, gyro rotors, or the H-style turbines, have had moderate success. These turbines tend to have lower overall power efficiency and have little advantage over the dominant horizontal axis turbines. These turbines, however, do not need to be turned into the wind, they tend to be quieter and they have few moving parts.

Most turbines, whether horizontal or Vertical axis, typically need towers to raise the turbines high above the ground surfaces where the wind velocity is much higher and therefore more beneficial. The towers are an expensive component and in most cases they limit the size of the turbine.

PCT/CA2008/000678 by Lux discloses a lift-type or modified darrieus-type turbine with three or more blades at circumferentially spaced positions about the turbine rotor in which a plurality of support members are connected between adjacent ones of the blades in a generally circumferential direction about a full circumference of the rotor. The generally circumferential support members are described as being advantageous for optimally pre-stressing the blades and providing support to the blades against centrifugal forces. To minimize the drag, all of the support members are described as being horizontal in orientation between adjacent blades; however in this instance a large number of support members may be required and additional diametrically extending supports may be required to adequately support the blades.

SUMMARY OF THE INVENTION

According to one aspect of the invention there is provided a lift-type turbine comprising:

a base structure;

a rotor supported for rotation on the base structure about a vertical axis of rotation, the rotor comprising at least three blades supported relative to one another at circumferentially spaced positions about the vertical axis of rotation;

each blade comprising a working section having an airfoil shape in cross section such that the blades generate a torque in a direction of rotation of the turbine about the vertical axis responsive to a generally horizontal wind across the blades as the blades are rotated in the direction of rotation of the turbine;

a plurality of support members connected between adjacent ones of the blades to extend in a generally circumferential direction about the turbine;

at least some of the support members comprising transverse support members in which each transverse support member is coupled to each blade at a different elevation than adjacent ones of the blades such that the transverse support members extend between each adjacent pair of the blades at an inclination from horizontal.

By providing a plurality of blades, for example three or more, which are supported by additional support members spanning under tension between adjacent blades in a horizontal direction, a minimum number of parts is required to form the structure of the blades while minimizing the drag produced during rotation thereof. The support members being connected only between adjacent blades when there are three or more blades results in the support members lying generally in a common peripheral or circumferential path during rotation so as to have minimal effect on drag. The tension of the support members can support the blades in a pre-stressed condition to optimize the shape and performance thereof. Furthermore, when arranged in a generally circumferential direction between adjacent ones of the blades and at various heights along the blades, the support members provide support against centrifugal forces on the blades during rotation. The inclination of the transverse support members from horizontal provides greater structural support than horizontally oriented support members with minimal adverse affects on wind resistance.

Each transverse support member is preferably coupled to at least one of the blades so as to be higher in elevation than both of the adjacent ones of the blades. Also each transverse support member is preferably coupled to at least one of the blades so as to be lower in elevation than both of the adjacent ones of the blades.

The plurality of blades may comprise a plurality of first blades and a plurality of second blades in an alternating configuration in the circumferential direction such that each first blade is located between an adjacent pair of second blades. In this instance, the transverse support members preferably include a first support member coupled to each first blade at a higher elevation than each of the adjacent pair of second blades and a second support member coupled to each first blade at a lower elevation than each of the adjacent pair of second blades.

The first support member and the second support member preferably intersect one another between each adjacent pair of first and second blades.

Alternatively, the first support member may be adjacent to and above the second support member about a full circumference of the rotor. In this instance, the first support member may be connected to each blade at a location spaced above the second support member, or the first support member may be connected to some of the blades at a common location with the second support member.

Preferably each transverse support member comprises a plurality of sections in which each section extends between a respective adjacent pair of blades and in which each section is oriented at an angle of approximately 10 to 15 degrees from horizontal.

In some embodiments, each blade is oriented vertically between a top end and a bottom end and each blade is supported on a central shaft of the rotor by radially extending struts connected between the shaft and the blades respectively.

Preferably the working section of each blade comprises an intermediate portion spanning between a top end and a bottom end, in which the top ends of the blades are joined with one another at the axis of rotation at a top yoke and the bottom ends of the blades being joined with one another at the axis of rotation at a bottom yoke such that the intermediate portions are curved outwardly in the radial direction relative to the top and bottom ends. In some embodiments, one of the top yoke or the bottom yoke is slidable relative to the other yoke in an axial direction of the axis of rotation of the rotor.

There may be provided a weight member of increased mass supported on each support member at intermediate location between each adjacent pair of the blades. Some of the weight members may be connected to an intersection of more than one of the support members.

Preferably the rotor comprises an even number of blades, such as four, six, eight, ten or more blades.

In some embodiments, the rotor is shaftless such that the rotor is open and unobstructed along the vertical axis of rotation between opposing top and bottom ends of the blades. In this instance, the rotor may consist only of the blades extending between the top ends thereof joined together at a top end of the rotor and the bottom ends thereof joined at a bottom end of the rotor and the support members supported under tension between respective ones of the blades.

The support members may only comprise flexible members. Alternatively, the support members may comprise any form of ropes, cables, beams or struts formed of rigid, flexible or composite materials while remaining relatively lightweight.

In some embodiments, the rotor comprises a running surface which is substantially cylindrical about the vertical axis of rotation and there is provided at least one driven member rotatably supported in relation to the base structure so as to be operationally engaged with the running surface. Preferably driven member is coupled to a respective generator so as to be arranged to drive the generator. The running surface may have a diameter between 10% and 30% of the rotor, or more preferably near 20% a diameter of the rotor.

Furthermore, in some embodiments the driven member is frictionally engaged with the running surface so as to be arranged for rolling movement along the running surface as the rotor is rotated relative to the base structure. Alternatively, the driven member may be coupled to the cylindrical running surface by belts, chains or gears for example.

In preferred embodiments, a tensioning mechanism is arranged to urge opposing top and bottom ends of the rotor towards one another such that the blades are supported under compression in a pre-stressed condition arranged to maintain the blades in a substantially rigid and fixed orientation throughout operation of the rotor.

Some embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
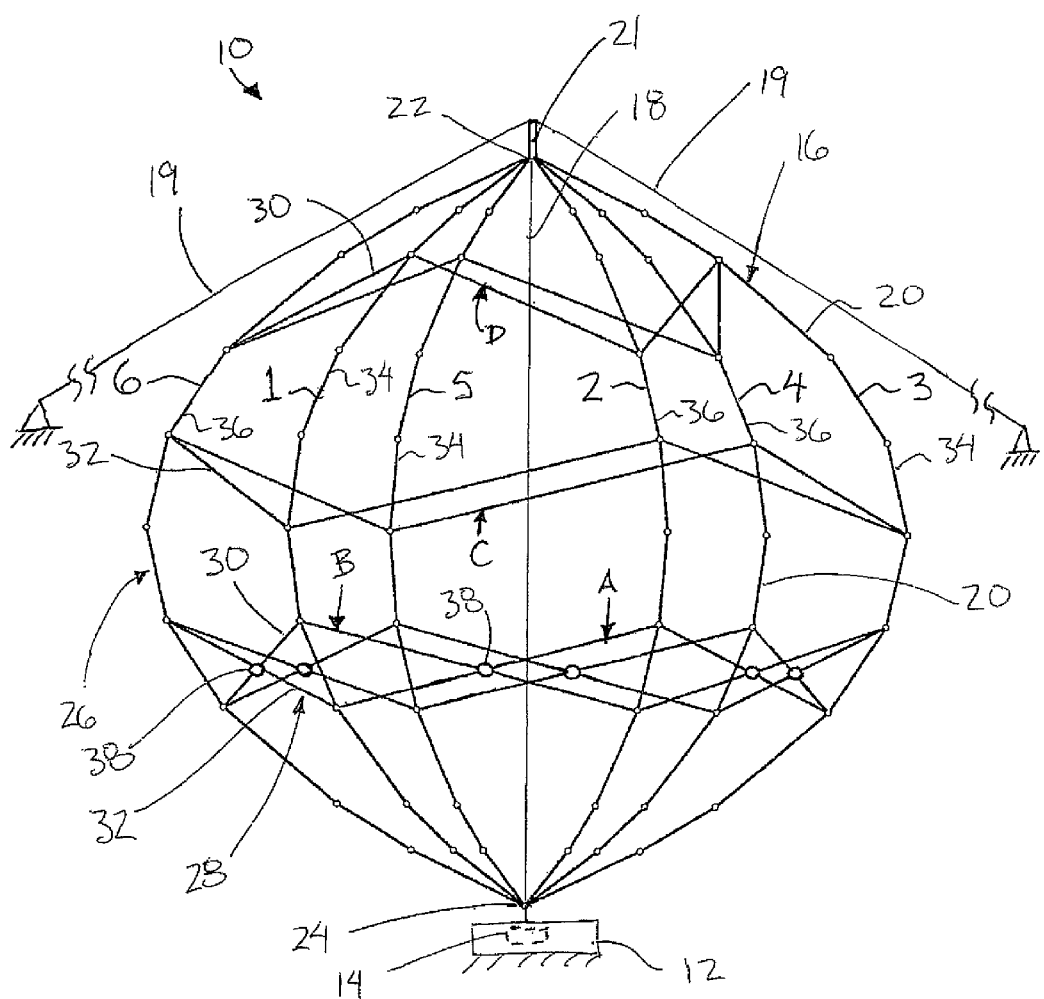
FIG. 1 is an elevational view of a first embodiment of the turbine.

Referring to the accompanying figures there is illustrated a turbine generally indicated by reference numeral 10. The turbine 10 comprises a lift type turbine oriented for rotation about a vertical axis.

Although various embodiments are described and illustrated herein, the common elements of the various embodiments will first be described.

The turbine comprises a base structure 12 arranged to be supported in generally fixed relation to the ground or other supporting surface. The base structure typically houses a suitable generator 14 for generating power responsive to rotation of the rotor 16 of the turbine. The base structure includes suitable bearings for rotatably supported a bottom end of the rotor thereon for rotation relative to the base structure about a vertical axis 18 of rotation A top end of the rotor is coupled by suitable guy wires 19 or other supporting members which are connected between a hub 21 at the top end of the rotor and the ground. The wires 19 thus span radially outward at a downward inclination to the ground at evenly spaced positions in the circumferential direction. The rotor is rotatable relative to the hub 21 by suitable bearings therebetween including radial bearings in the radial direction and thrust bearings in the axial direction to maintain the axis 18 in a vertical orientation while also allowing a downward force to be applied to the hub 21 and the top end of the rotor by the wires 19 as described in further detail below.

The rotor 16 comprises a plurality of blades 20 located at circumferentially spaced positions about the axis 18. Typically three or more blades are provided, preferably in an even number for example six blades in the first embodiment of FIG. 1 or four blades in the second embodiment of FIG. 2.

In the illustrated embodiments, each blade 20 comprises a darrieus type turbine blade which forms a continuous curve between a top end 22 and a bottom end 24 located substantially at the axis or rotation of the rotor at respective top and bottom ends of the rotor. An intermediate portion of the blade between the top and bottom ends defines a working section 26 extending substantially a full height of the blade between the top and bottom ends thereof. The blades each extend generally radially outward from the top and bottom ends towards the center where the blade is located at its farthest distance radially outward from the axis of rotation.

Each blade 20 has a cross section having an airfoil shape such that the blades generate a torque in a common direction of rotation of the turbine about the vertical axis responsive to a generally horizontal wind across the blades as the blades are rotated in the direction of rotation of the turbine.

To provide additional support to the blades, the rotor includes a plurality of support members 28 which extend in a generally circumferential direction about a full circumference of the rotor in connection with each of the blades. Each support member 28 comprises a plurality of sections in which each section is substantially straight and extends generally linearly between an adjacent pair of the blades. In preferred embodiments the support members comprise lightweight flexible steel cables supported under tension between adjacent ones of the blades; however, any lightweight member able to be supported under tension would be suitable.

In the illustrated embodiments each support member comprises a transverse support member such that each section between an adjacent pair of the blades extends at an inclination from horizontal for example in the range of 10° to 15° from horizontal. An inclination between 1 degree and 90 degrees may be beneficial; however, an inclination near 15° from horizontal is typically desirable. Accordingly each support member is connected to each blade at a different elevation than adjacent ones of the blades.

Figure 3:
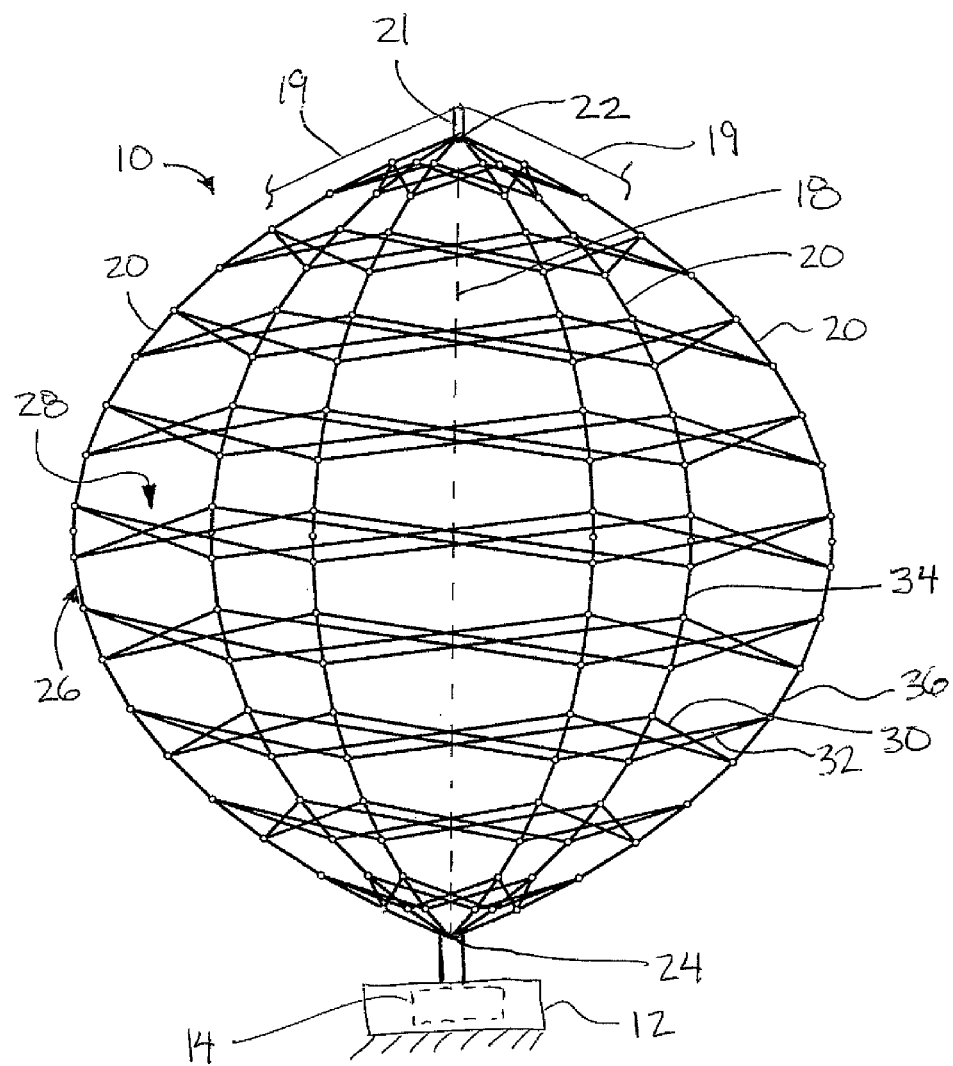
FIG. 3 is an elevational view of a further embodiment of the turbine.

Typically many support members are provided at different elevations between the top and bottom ends of the blades. In the example of FIG. 3, nine pairs of support members are provided, in which each support member forms a full circumference about the rotor and each pair of support members are intersecting between each adjacent pair of blades. In further embodiments many more or less support members may be provided.

In the illustrated embodiments, each of the turbines comprises one or more first support members 30 and one or more second support members 32 at different elevations relative to one another with each extending fully circumferentially about the rotor.

In the illustrated embodiments the plurality of blades comprise a plurality of first blades 34 and a plurality of second blades 36 which are supported in an alternating configuration in the circumferential direction such that each first blade is supported between an adjacent pair of the second blades and each second blade is supported between an adjacent pair of the first blades. As shown in FIG. 1, the blades are numbered one through six in sequence in a circumferential direction about the rotor such that blades 1, 3 and 5 comprise first blades 34 and blades 2, 4 and 6 comprise second blades 36.

In this instance each first support member 30 is coupled to each first blade 34 at a higher elevation than each of the adjacent pairs of second blades 36 and each second support member 32 is coupled to each first blade 34 at a lower elevation than each of the adjacent pairs of second blades 36.

More particularly the first support member is coupled to each of the first blades at a common first elevation which is higher than the coupling of that support member to each of the second blades. Also the first support member is coupled to each of the second blades at a common second elevation lower than the first elevation.

Similarly each second support member is also coupled to each first blade at a common first elevation and is coupled to each second blade at a common second elevation; however, the second elevation is higher than the first elevation in this instance.

In all of the illustrated embodiments, each first support member 30 is paired with a corresponding second support member 32 in which the support members are either supported directly one above the other or they are intertwined such that the first and second support members intersect one another at various locations about the circumference of the rotor.

As shown in FIG. 1, the support members A and B are shown in an intersecting manner in which the support members intersect one another between each adjacent pair of blades. In this instance the first support member is coupled to the first blades and the second support member is coupled to the second blades all at a common first elevation above a common second elevation. At the second elevation, the first support member is coupled to the second blades and the second support member is coupled to the first blades.

Figure 2:
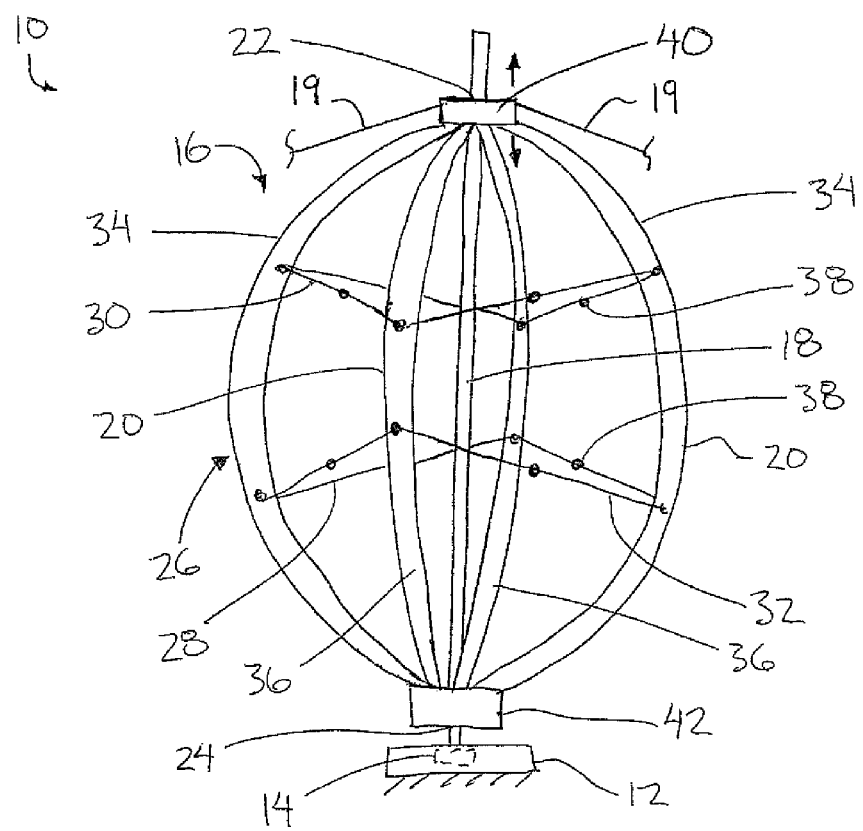
FIG. 2 is an elevational view of a second embodiment of the turbine.

Alternately a corresponding pair of first and second support members may be arranged similarly to support members C and D of FIG. 1 or in accordance with the first and second support members shown in FIG. 2 such that the first and second support members do not intersect one another. In this instance the first support member remains adjacent to but spaced above the second support member about the full circumference of the rotor.

In yet a further configuration, the first and second support members may be supported one above the other in a non-intersecting manner, however the first support member may be coupled to each second blade at a common location as the second support member so that the lowest elevation of the first support member corresponds to the highest elevation of the second support member while the majority of the first support member remains spaced above the second support member.

In the illustrated embodiments a plurality of weight members 38 are mounted on each section of each support member at an intermediate location centered between each adjacent pair of blades. Where support members are intersecting one another, the weight member 38 is provided at the intersection of two support members. In each instance the weight member comprises a portion of increased mass on the support member so as to encourage the cable forming the support member to follow a common circular path with the blades due to the centrifugal forces acting on the weight members. The weight members 38 are suitably arranged to have an aerodynamic profile to reduce the drag thereof.

In the first embodiment of FIG. 1, the rotor includes a vertical shaft extending along the vertical axis 18 of rotation between the top and bottom ends of the rotor. The top ends 22 of the blades in this instance are joined together with the shaft at the vertical axis of rotation at the top end of the rotor and the bottom ends 24 are similarly joined together with the shaft at the axis of rotation at the bottom end of the rotor. The shaft in this instance may be supported under tension between the top and bottom ends of the rotor to urge the blades to bow radially outwardly. This force is opposite to the compressive force applied to the blades by the circumferential support members 28 which urges the blades radially inwardly such that the blades are supported under compression in a pre-stressed condition which maintains the blades substantially rigid and fixed in orientation throughout the operation of the turbine regardless of the wind conditions.

Turning now more particularly to the second embodiment of FIG. 2, the rotor comprises a shaft similar to FIG. 1, but the top ends of the blades are shown connected with one another by a top yoke 40 supported by a suitable bearing for sliding displacement along the shaft. The guy wires 19 in this instance are connected to the top yoke 40. Similarly the bottom ends are all commonly connected on a bottom yoke 42; however the bottom yoke is fixed relative to the shaft. The top yoke 40 is supported for rotation with the shaft but remains slidable in the axial direction of the axis of rotation along the shaft relative to the bottom yoke. Alternatively, the top yoke may be fixed in the axial direction and the bottom yoke may be slidable along the shaft towards the top yoke. A suitable control mechanism in the form of a spring, hydraulic pressure or weights for example is used to pull the ends of the rotor towards one another by urging the top yoke downwardly towards the bottom yoke, or urging the bottom yoke upwardly towards the top yoke, to effectively bow the blades outwardly in the radial direction to increase the tension on the support members connected in the generally circumferential direction about the rotor. The downward force on a sliding top yoke may also be provided by the guy wires 19. The control mechanism may be operated depending upon the circumstances. For example, if the turbine is parked and surrounded by high winds, a downward force on the top yoke may be preferred. The downward or upward force may vary according to wind speed or rotational speed.

Turning now to the embodiment of FIG. 3, the blades are again joined to one another at the top ends 22 and at the bottom ends 24 at the axis of rotation, but there is no shaft provided along the axis of rotation. The rotor in this instance remains open and unobstructed along the axis of rotation between the top and bottom ends of the blades at the top and bottom ends of the rotor respectively. The blades in this instance are only supported by connection to one another and by connection of the support members 28 extending under tension between adjacent ones of the blades generally in the circumferential direction. In some instances, some additional support may be provided by auxiliary support members spanning under tension in a diametrical direction between diametrically opposed ones of the blades. The auxiliary support members would typically also comprise flexible cables, but may comprise any lightweight member capable of being supported under tension.

The guy wires 19 in the embodiment of FIG. 3 may provide a downward force to the top end of the rotor through the hub 21 while an opposing upward force is provided to the bottom end of the rotor through corresponding thrust bearings in the axial direction at the base structure 12 such that a force of tension along the vertical axis 18 of rotation is created between the top and bottom ends of the rotor even in the absence of a shaft along the axis. The force of the top and bottom ends of the rotor being urged together thus acts to urge the blades to bow radially outwardly as described above. As this force is opposite to the compressive force applied to the blades by the circumferential support members 28 which urges the blades radially inwardly, the blades are again supported under compression in a pre-stressed condition which maintains the blades substantially rigid and fixed in orientation throughout the operation of the turbine regardless of the wind conditions.

Figure 4:
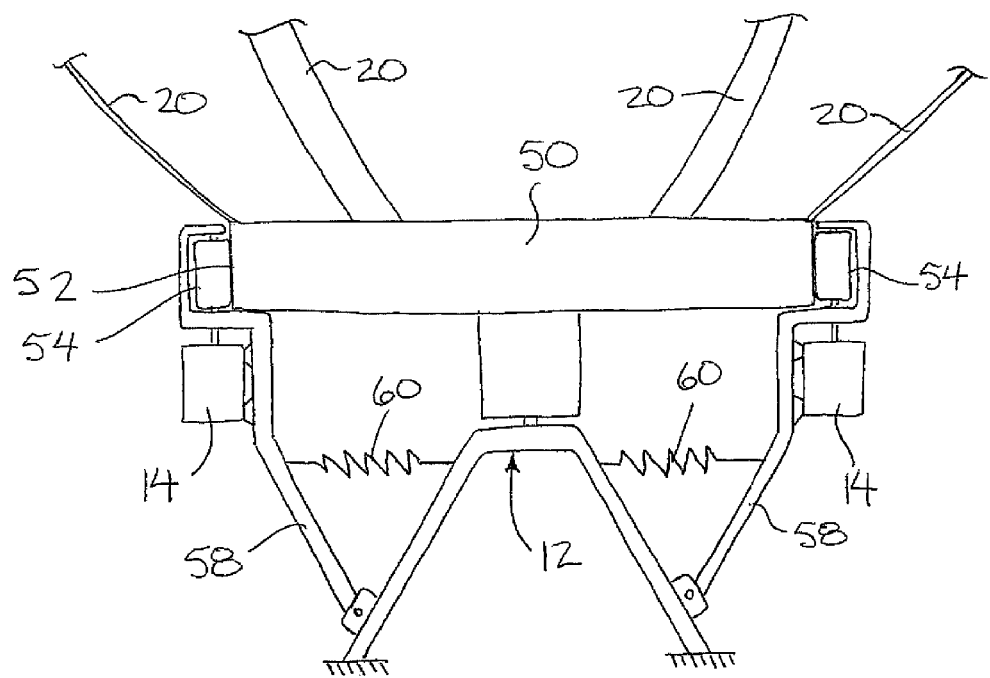
FIG. 4 is an elevational view of a bottom end of a further embodiment of the turbine.

Turning now to the embodiment of FIG. 4, the bottom ends of the blades in this instance are joined to an annular drive member at respective circumferentially spaced positions thereon. The annular drive member 50 has a smaller diameter than the rotor at the central portion of the working sections of the blades where the rotor has the greatest diameter such that the blades continue to taper downwardly and radially inwardly towards one another and towards the connection to the annular drive member at the bottom end. For example, the annular drive member 50 has a diameter of approximately 1/5 of the maximum diameter of the blades.

The annular drive member 50 defines a generally cylindrical running surface 52 for connection to the generator 14. A plurality of driven members 54 are supported in engagement with the running surface 52 for rotation about a respective vertical driven axis, parallel and spaced from the vertical axis 18 of the rotor.

In the illustrated embodiment, the outer surface of the driven members and the running surface 52 are formed of suitable materials to allow the driven members to be driven to rotate by frictional rolling engagement only with the running surface 52. For example the driven members may comprise rubber wheels for gripping the running surface which may be metal or may have a texture or coating of high friction material applied thereon. The driven members are then coupled by suitable gearing (not shown) to drive the input rotation of a respective electricity generator 14 in response to rotation of the driven members.

The driven members 54 are rotatably supported on respective support frames 58 which also support the gearing and the respective generator thereon. Each support frame is supported for movement relative to the base structure 12 rotatably supporting the rotor thereon such that the support frame is biased in a radial direction of the vertical rotor axis 18 to urge the driven members into positive engagement with the running surface 52. The amount of biasing force provided is an adjustable set point which can be automatically adjusted in response to varying wind force.

In the illustrated embodiment, each support frame 58 is pivotally supported relative to the base structure 12 and biasing force is provided by springs 60 to bias the driven members horizontally inward into engagement with an externally facing running surface 52. In alternative embodiments however, the driven members may be supported for horizontal sliding movement relative to the base structure for example. Furthermore, the driven members may be mounted internally relative to the annular member such that the biasing mechanism 60 acts in a radially outward direction for positive engagement with an inward facing running surface.

The plurality of support frames 58 are typically provided at spaced positions in the circumferential direction, each supporting the respective generator and the respective driven members 54 arranged for rolling contact with the running surface. A controller in this instance allows a selected number of the support frames to engage the running surface depending upon the wind force available. With less wind, a lesser number of driven members and support frames would typically engage the running surface. Alternatively, all of the driven members would engage the running surface under high wind loads.

The resulting turbine has several benefits. First, the material required to make the hub, shaft and bearing are reduced due to the small lateral and vertical forces as compared to a horizontal axis wind turbine. Second, the torque is substantially zero at the bottom of the hub. Also, a smaller brake system can be used on the annular member 50 as opposed to the shaft at the axis 18. The small wheel contact area can be made larger when placed inside the annular drive member. Furthermore, maintenance can be performed substantially at ground level.

In yet further embodiments, each blade may be vertical in orientation between top and bottom ends to be connected to the central shaft by radial struts as in an H-style turbine, but with 4 or more blades being provided as described above instead of only two blades as in traditional H-style turbines. In the instance of 4 or more blades, the blades are evenly circumferentially spaced about the shaft as described above with regard to blades 20 so that a similar configuration of support members 28 can extend generally circumferentially about the rotor with sections of the support members between adjacent blades being inclined from horizontal as noted above.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A lift-type turbine comprising:
    a base structure;
    a rotor supported for rotation on the base structure about a vertical axis of rotation, the rotor comprising at least three blades supported relative to one another at circumferentially spaced positions about the vertical axis of rotation in which each blade extends between top and bottom ends of the rotor;
    each blade comprising a working section having an airfoil shape in cross section such that the blades generate a torque in a direction of rotation of the turbine about the vertical axis responsive to a generally horizontal wind across the blades as the blades are rotated in the direction of rotation of the turbine;

a plurality of flexible support members connected under tension between adjacent ones of the blades to extend in a generally circumferential direction about the turbine;

at least some of the support members comprising transverse support members in which each transverse support member is coupled to each blade at a different elevation than adjacent ones of the blades such that the transverse support members extend between each adjacent pair of the blades at an inclination from horizontal and such that at least some of the flexible support members intersect one another between the blades.

2. The turbine according to claim 1 wherein each transverse support member is coupled to at least one of the blades so as to be higher in elevation than both of the adjacent ones of the blades and is coupled to at least one of the blades so as to be lower in elevation than both of the adjacent ones of the blades.

3. The turbine according to claim 1 wherein the plurality of blades comprise a plurality of first blades and a plurality of second blades in an alternating configuration in the circumferential direction such that each first blade is located between an adjacent pair of second blades, and wherein the transverse support members include a first support member coupled to each first blade at a higher elevation than each of the adjacent pair of second blades and a second support member coupled to each first blade at a lower elevation than each of the adjacent pair of second blades.

4. The turbine according to claim 3 wherein the first support member and the second support member intersect one another.

5. The turbine according to claim 4 wherein the first support member and the second support member intersect one another between each adjacent pair of first and second blades.

6. The turbine according to claim 3 wherein the first support member is adjacent to and above the second support member about a full circumference of the rotor.

7. The turbine according to claim 6 wherein the first support member is connected to each blade at a location spaced above the second support member.

8. The turbine according to claim 6 wherein the first support member is connected to some of the blades at a common location with the second support member.

9. The turbine according to claim 1 wherein each transverse support member comprises a plurality of sections in which each section extends between a respective adjacent pair of blades, each section being oriented at an angle of approximately 10 to 15 degrees from horizontal.

10. The turbine according to claim 1 wherein the working section of each blade comprises an intermediate portion spanning between a top end and a bottom end, the top ends of the blades being joined with one another at the axis of rotation at a top yoke and the bottom ends of the blades being joined with one another at the axis of rotation at a bottom yoke such that the intermediate portions are curved outwardly in the radial direction relative to the top and bottom ends, one of the top yoke or the bottom yoke being slidable relative to the other yoke in an axial direction of the axis of rotation of the rotor.

11. The turbine according to claim 1 wherein there is provided a weight member of increased mass supported on each support member at an intermediate location between each adjacent pair of the blades.

12. The turbine according to claim 1 wherein the rotor comprises at least four blades.

13. The turbine according to claim 1 wherein the rotor comprises a running surface which is substantially cylindrical about the vertical axis of rotation and wherein there is provided at least one driven member rotatably supported in relation to the base structure so as to be operationally engaged with the running surface, said at least one driven member being coupled to a generator so as to be arranged to drive the generator.

14. The turbine according to claim 13 wherein the running surface has a diameter between 10% and 30% of the rotor.

15. The turbine according to claim 13 wherein said at least one driven member is frictionally engaged with the running surface so as to be arranged for rolling movement along the running surface as the rotor is rotated relative to the base structure.

16. A lift-type turbine comprising:
a base structure;
a rotor supported for rotation on the base structure about a vertical axis of rotation, the rotor comprising at least three blades supported relative to one another at circumferentially spaced positions about the vertical axis of rotation;
each blade comprising a working section having an airfoil shape in cross section such that the blades generate a torque in a direction of rotation of the turbine about the vertical axis responsive to a generally horizontal wind across the blades as the blades are rotated in the direction of rotation of the turbine;
a plurality of support members connected between adjacent ones of the blades to extend in a generally circumferential direction about the turbine; and
at least some of the support members comprising transverse support members in which each transverse support member is coupled to each blade at a different elevation than adjacent ones of the blades such that the transverse support members extend between each adjacent pair of the blades at an inclination from horizontal;
wherein the rotor is shaftless such that the rotor is open and unobstructed along the vertical axis of rotation between opposing top and bottom ends of the blades.

17. The turbine according to claim 16 wherein the rotor consists only of the blades extending between the top ends thereof joined together at a top end of the rotor and the bottom ends thereof joined at a bottom end of the rotor and the support members supported under tension between respective ones of the blades.

18. The turbine according to claim 17 wherein the support members only comprise flexible members.

19. A lift-type turbine comprising:
a base structure;
a rotor supported for rotation on the base structure about a vertical axis of rotation, the rotor comprising at least three blades supported relative to one another at circumferentially spaced positions about the vertical axis of rotation;
each blade comprising a working section having an airfoil shape in cross section such that the blades generate a torque in a direction of rotation of the turbine about the vertical axis responsive to a generally horizontal wind across the blades as the blades are rotated in the direction of rotation of the turbine;
a plurality of support members connected between adjacent ones of the blades to extend in a generally circumferential direction about the turbine;
at least some of the support members comprising transverse support members in which each transverse support member is coupled to each blade at a different elevation than adjacent ones of the blades such that the transverse support members extend between each adjacent pair of the blades at an inclination from horizontal; and each transverse support member being coupled to at least one of the blades so as to be higher in elevation than both of the adjacent ones of the blades and is coupled to at least one of the blades so as to be lower in elevation than both of the adjacent ones of the blades.

\* \* \* \* \*